(12) United States Patent
Williams et al.

(10) Patent No.: US 8,248,762 B2
(45) Date of Patent: Aug. 21, 2012

(54) RELIABLE ASYNCHRONOUS SERIAL PROTOCOL BETWEEN REMOTE OPERATED DEVICES AND INPUT/OUTPUT CONTROLLER

(75) Inventors: David M Williams, Alpharetta, GA (US); Paul Terricciano, Roswell, GA (US); Seshagiri R Marellapudi, Norcross, GA (US); Ravikumar Balasubramaniam, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1657 days.

(21) Appl. No.: 11/635,438

(22) Filed: Dec. 7, 2006

(65) Prior Publication Data

US 2008/0086579 A1 Apr. 10, 2008

Related U.S. Application Data

(60) Provisional application No. 60/826,564, filed on Sep. 22, 2006.

(51) Int. Cl.
*H02B 1/20* (2006.01)
(52) U.S. Cl. ........................................ 361/627; 361/601

(58) Field of Classification Search ............. 379/102.01, 379/102.03, 102.04; 361/601, 602, 627, 361/634, 641, 644; 700/19, 22, 286; 307/31, 307/38
See application file for complete search history.

(56) References Cited

U.S. PATENT DOCUMENTS

| | | | | |
|---|---|---|---|---|
| 4,899,217 A * | 2/1990 | MacFadyen et al. | ........... | 725/80 |
| 4,996,646 A * | 2/1991 | Farrington | .................... | 700/293 |
| 5,185,705 A * | 2/1993 | Farrington | .................... | 700/292 |
| 7,566,986 B2 * | 7/2009 | DeBoer et al. | ................... | 307/31 |
| 7,907,388 B2 * | 3/2011 | DeBoer et al. | ................ | 361/628 |
| 8,018,089 B2 * | 9/2011 | King et al. | ....................... | 307/31 |

* cited by examiner

*Primary Examiner* — Binh Tieu

(57) ABSTRACT

An electrical distribution system is provided for selectively connecting an electrical power source to load devices, comprising a panelboard having load circuit positions. A remote operated device is mountable in the panelboard comprising a load control device, a programmed controller for operating the load control device and a communication circuit. An input/output (I/O) controller is mounted in the panelboard for controlling operation of the remote operated device, the I/O controller comprising a programmed controller, and a communication circuit for communication with the remote operated device communication circuit. The communication circuits are adapted to communicate using an asynchronous communication protocol comprising transfer of data in two directions.

20 Claims, 7 Drawing Sheets

Header Portion of a Packet

Data Portion of a Packet

RELIABLE ASYNCHRONOUS SERIAL PROTOCOL BETWEEN REMOTE OPERATED DEVICES AND INPUT/OUTPUT CONTROLLER

CROSS REFERENCE TO RELATED APPLICATIONS

This application claims priority of provisional application No. 60/826,564 filed Sep. 22, 2006, the contents of which is incorporated by reference herein.

FIELD OF THE INVENTION

This invention relates generally to residential and commercial electrical power distribution panels and components, and more particularly, to a system using asynchronous serial protocol communications between remote operated devices and an input/output controller in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

As is apparent, the intended function of a power distribution system of the type disclosed is to switch loads on or off. For example, in a lighting control panel, the system can be used to automatically control lighting loads according to desired schedules. A control system communicates with the individual remote-operated circuit breakers and commands operation of the same. The communications are unidirectional. There is no full duplex communication and the systems do not enable the two-way exchange of data.

The present invention is directed to further improvements in electrical distribution panels.

SUMMARY OF THE INVENTION

In accordance with the invention, there is provided an electrical distribution system using asynchronous serial protocol communications between remote operated devices and an input/output controller.

There is disclosed in accordance with one aspect of the invention an electrical distribution system for selectively connecting an electrical power source to load devices, comprising a panelboard having load circuit positions. A remote operated device is mountable in the panelboard comprising a load control device, a programmed controller for operating the load control device and a communication circuit. An input/output (I/O) controller is mounted in the panelboard for controlling operation of the remote operated device, the I/O controller comprising a programmed controller, and a communication circuit for communication with the remote operated device communication circuit. The communication circuits are adapted to communicate using an asynchronous communication protocol comprising transfer of data in two directions.

It is a feature of the invention that the communication protocol provides message initiation in both the I/O controller and the remote operated device.

It is another feature of the invention that the remote operated device sends a message to the I/O controller indicating that load control device operating parameters have not been set.

It is a further feature of the invention that the remote operated device sends a message to the I/O controller indicating that a task queue is full.

It is still another feature of the invention that the asynchronous communication protocol is adapted so that a message indicates amount of data sent in the message.

It is an additional feature of the invention that the asynchronous communication protocol is adapted so that a message comprises a checksum value.

It is yet another feature of the invention that the remote operated device comprises a relay and the asynchronous communication protocol is adapted so that the I/O controller sends messages to the remote operated device to open or close a contact.

It is a feature of the invention that the asynchronous communication protocol is adapted so that the remote operated device sends messages comprising status of the load control device.

It is another feature of the invention that the asynchronous communication protocol is adapted so that the remote operated device sends messages comprising parameters of operation of the load control device.

It is a further feature of the invention that the asynchronous communication protocol is adapted so that the I/O controller sends messages to the remote operated device to load a new control program.

There is disclosed in accordance with another aspect of the invention a method of communicating in an electrical distribution system for selectively connecting an electrical power source to load devices, comprising: providing a panelboard having load circuit positions; providing a remote operated device mountable in the panelboard comprising a load control device and a programmed controller for operating the load control; providing an input/output (I/O) controller mounted in the panelboard for controlling operation of the remote operated device, the I/O controller comprising a programmed controller; and establishing a communication link between the remote operated device and the I/O controller using an asynchronous communication protocol comprising transfer of data in two directions.

Further features and advantages of the invention will be readily apparent from the specification and from the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, using asynchronous serial protocol communications between remote operated devices and an input/output controller. Control may include on/off switching, dimming and metering. The electrical distribution system may be as is generally described in U.S. application Ser. No. 11/519,727, filed Sep. 12, 2006, the specification of which is incorporated by reference herein.

Figure 1:
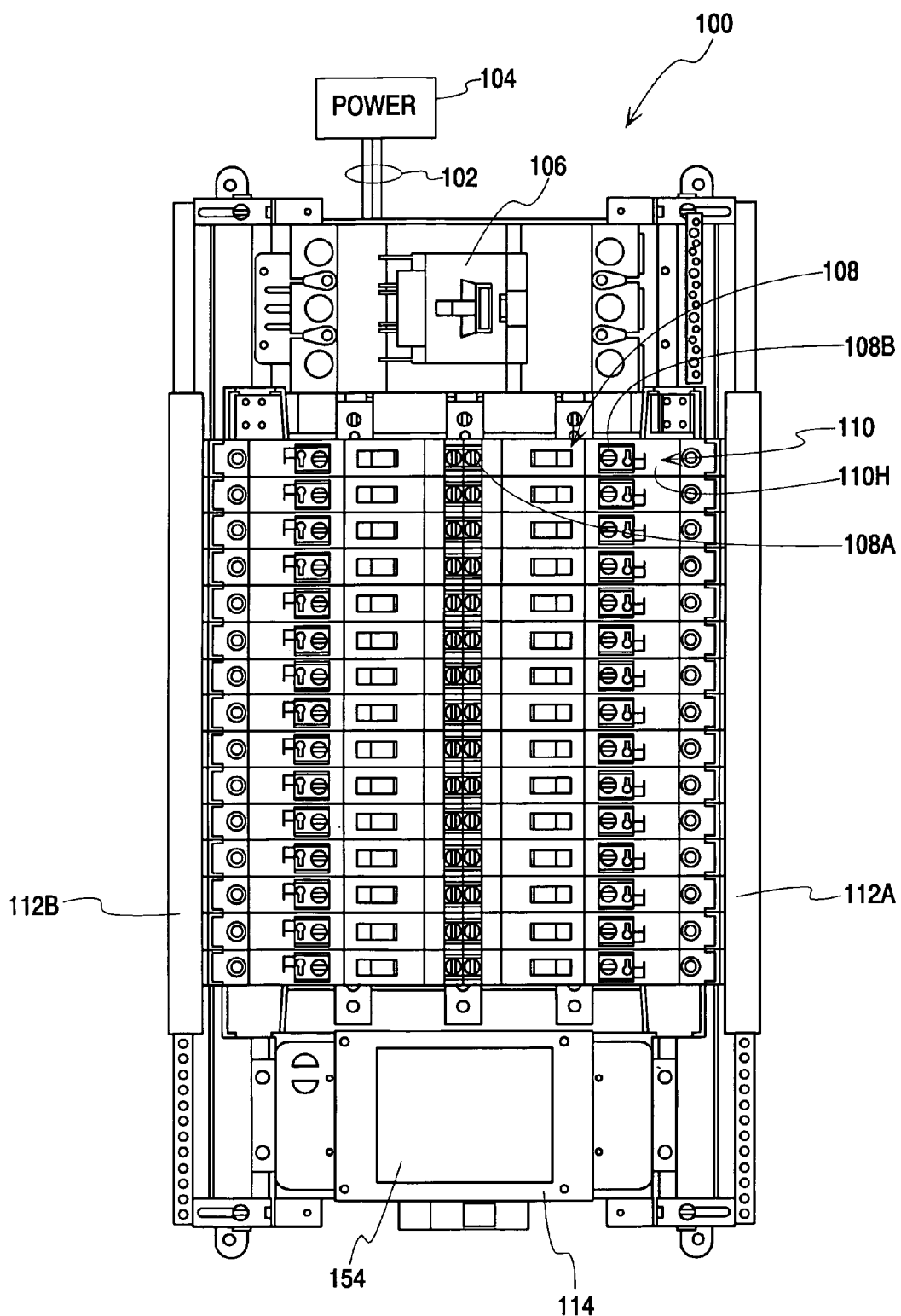
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty-two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts, in the relay embodiment, that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
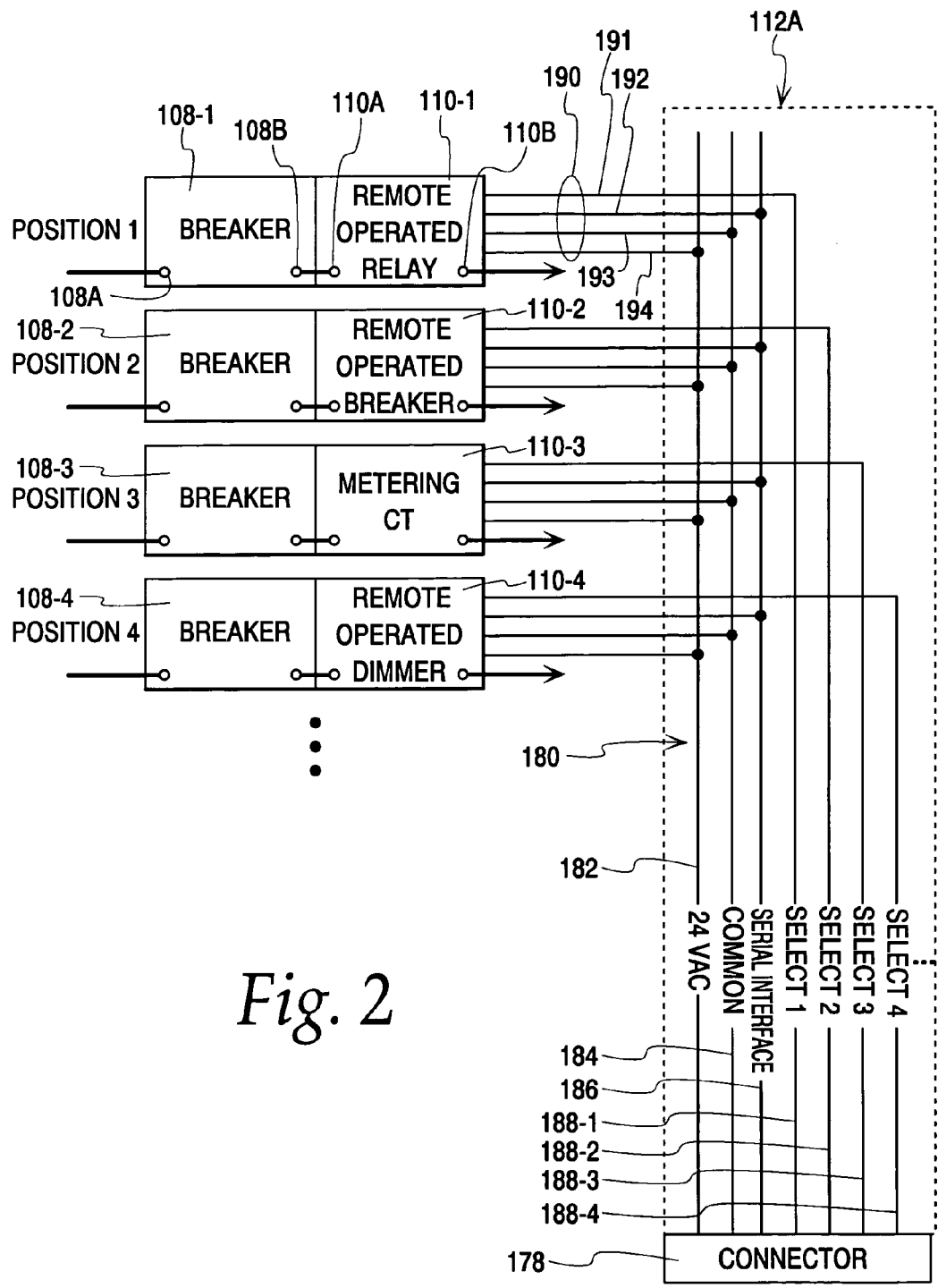
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device 110-3 comprises a current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
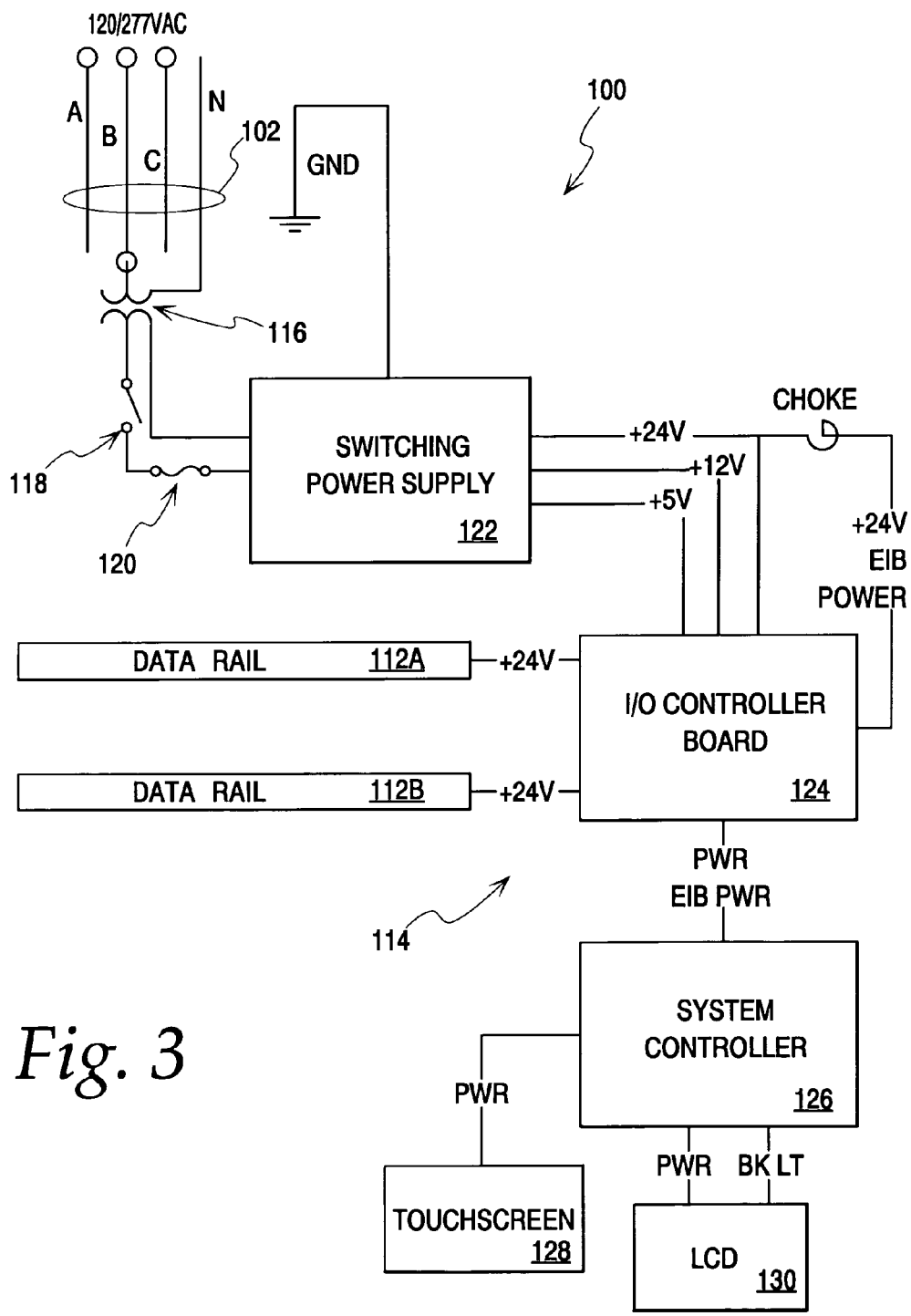
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
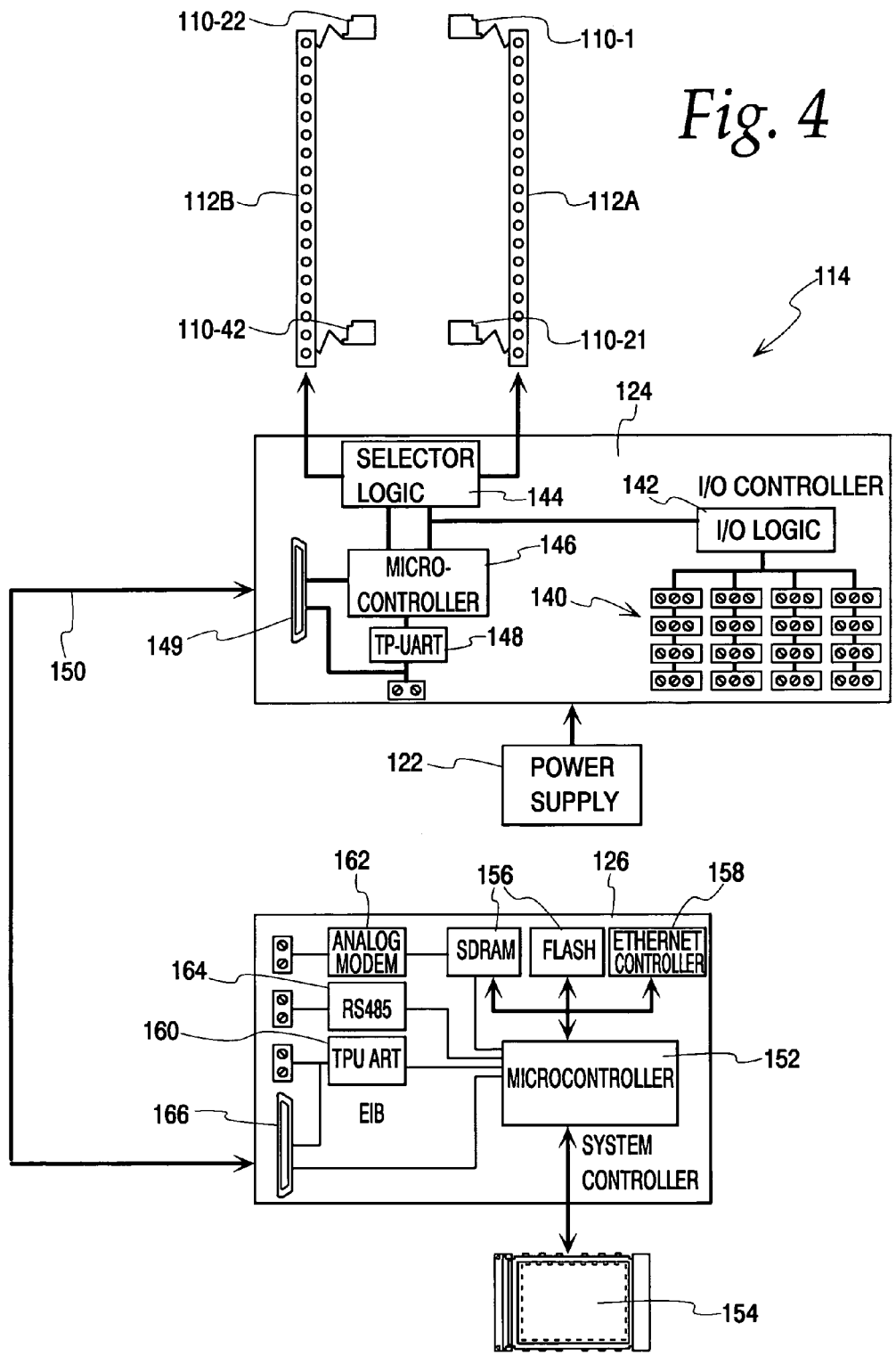
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 112A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS 485 interface circuit 164. A connector 162 is provided for connection to the cable 150 to communicate with the I/O controller 124.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines 188 are used by the I/O controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

Figure 5:
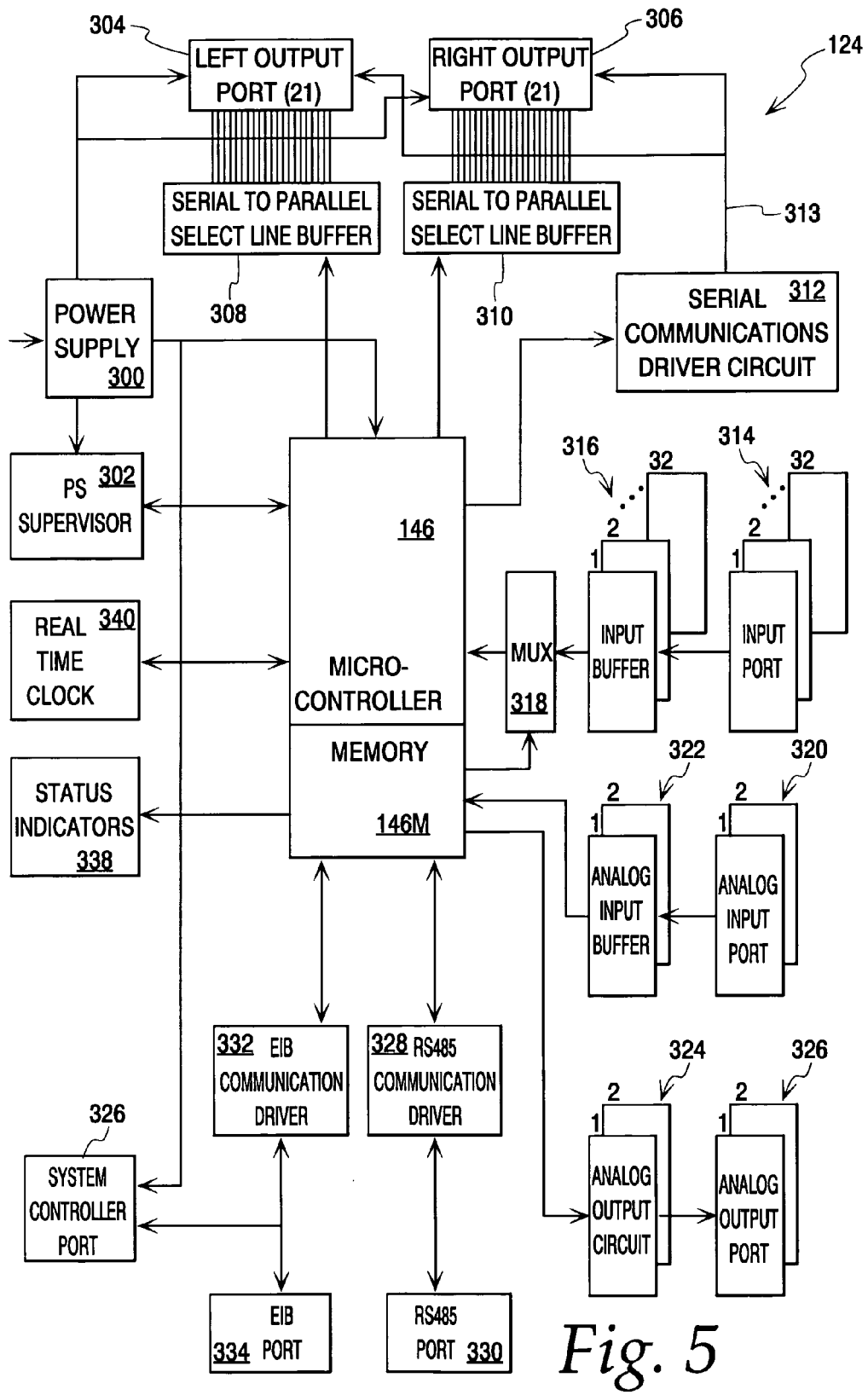
FIG. 5 is a detailed block diagram of the I/O controller of FIG. 3.

Referring to FIG. 5, the circuitry for the I/O controller 124 is illustrated in greater detail in block diagram form. The I/O controller 124 is powered from the external power supply 122, see FIG. 3, that feeds a power supply 300. The power supply 300 produces the voltages needed by the microcontroller 146 and all the other circuits making up the I/O controller 124. The microcontroller 146 may, for example, comprise a TI MSP430 microcontroller and associated memory 146M, such as flash memory or ROM memory, for storing operating programs and data, as is conventional. A power supply supervisor 302 monitors voltage and sends a reset to the microcontroller 146 if a voltage falls out of tolerance. The forty-two outputs for the individual remote operated devices 110, see FIG. 2, are divided into twenty-one left side outputs at a left output port 304 and twenty-one right side outputs at a right output port 306. Serial to parallel select line buffers 308 and 310 develop separate select or enable signals for each output device 110 from the microcontroller 146 to the respective output ports 304 and 306. The two serial to parallel blocks 308 and 310 are identical so that the same clock can drive both sides, further reducing output pins needed from the microcontroller 146.

A serial communication driver circuit 312 is used to isolate and drive a single wire serial communication line 313 from the microcontroller 146 to the output ports 304 and 306. Voltage and ground from the power supply 300 are also connected to the output ports 304 and 306. The single wire communication line 313 connects to each remote operated device 110, as described above, to transmit and receive commands and data. The serial communication driver circuit 312 provides necessary isolation and protection such that in the event of an individual remote operated device failure, the remainder of the devices continue to operate properly.

The I/O controller 124 has thirty-two discrete inputs connected to input ports 314. Each input port 314 is individually protected, conditioned, and buffered at input buffers 316 connected to the microcontroller 146 via a multiplexer 318 to allow reading eight inputs at a time. Since an input can be connected to a variety of devices, such as several different types of switches and occupancy sensors from different manufacturers, each input is read under different conditions controlled by the microcontroller 146. By reading the input twice, once with the input bias high and then again with the input bias low, the microcontroller 146 can determine a change of state regardless of whether the input is a switch contact or a positive DC voltage.

A pair of analog input ports 320 are used for reading analog inputs, such as photocells or potentiometers. The ports 320 consists of a three terminal connection, two analog inputs on the outside with a ground terminal in the center. The analog inputs are individually buffered at analog input buffers 322 and routed to analog inputs of the microcontroller 146. Analog outputs from the microcontroller 146 are created by sending a pulse width modulated (PWM) signal to a pair of analog output circuits 324. The analog output circuits 324 converts the PWM signal to a DC voltage corresponding to the duty cycle of the PWM. The outputs are then connected to analog output port 326. The analog output ports 326 may comprise three terminals with the two analog outputs connected to the two outside terminals with a ground terminal in the center.

The illustrated I/O controller 124 includes two means of a communication. The first is a master/slave protocol using an RS485 communication drive 328 with configurable termination and bias connected to an RS485 port 330. The RS485 port 330 has both an in and out connectors for daisy chaining RS485 connections. The second form of communication is an EIB or Konnex distributed processing protocol using an EIB communication driver 332 connected to an EIB port 334. The EIB port 334 is a two pin connection for attaching a twisted pair connector. In addition, the EIB communication lines are connect to a system controller port 336 along with voltage from the power supply 300. This port is used to communicate with the system controller 126 via the cable 150 connected to the connector 148, see FIG. 4, discussed above. As discussed above, the system controller 126 configures a system of multiple panels, sets up time schedules, maps inputs to outputs, and provides other building automation functions.

The microcontroller 146 can send signals to various types of status indicators 338 such as LEDs to show communications OK, operating properly, low voltage, etc. If a time schedule has been configured in the I/O controller 124, a real time clock 340 provides the ability to activate outputs based on time of day without intervention from a system controller 126 or other building automation system.

The present invention is part of a lighting control system consisting of the panelboard 100 with the main circuit breaker 106, multiple branch circuit breakers 108 and multiple remote operated devices 110. The remote operated devices 110 are controlled by the panel controller 114, particularly the I/O controller 124, via the data rails 112A and 112B. The primary application for the panel 100 is to control lighting loads.

Figure 6:
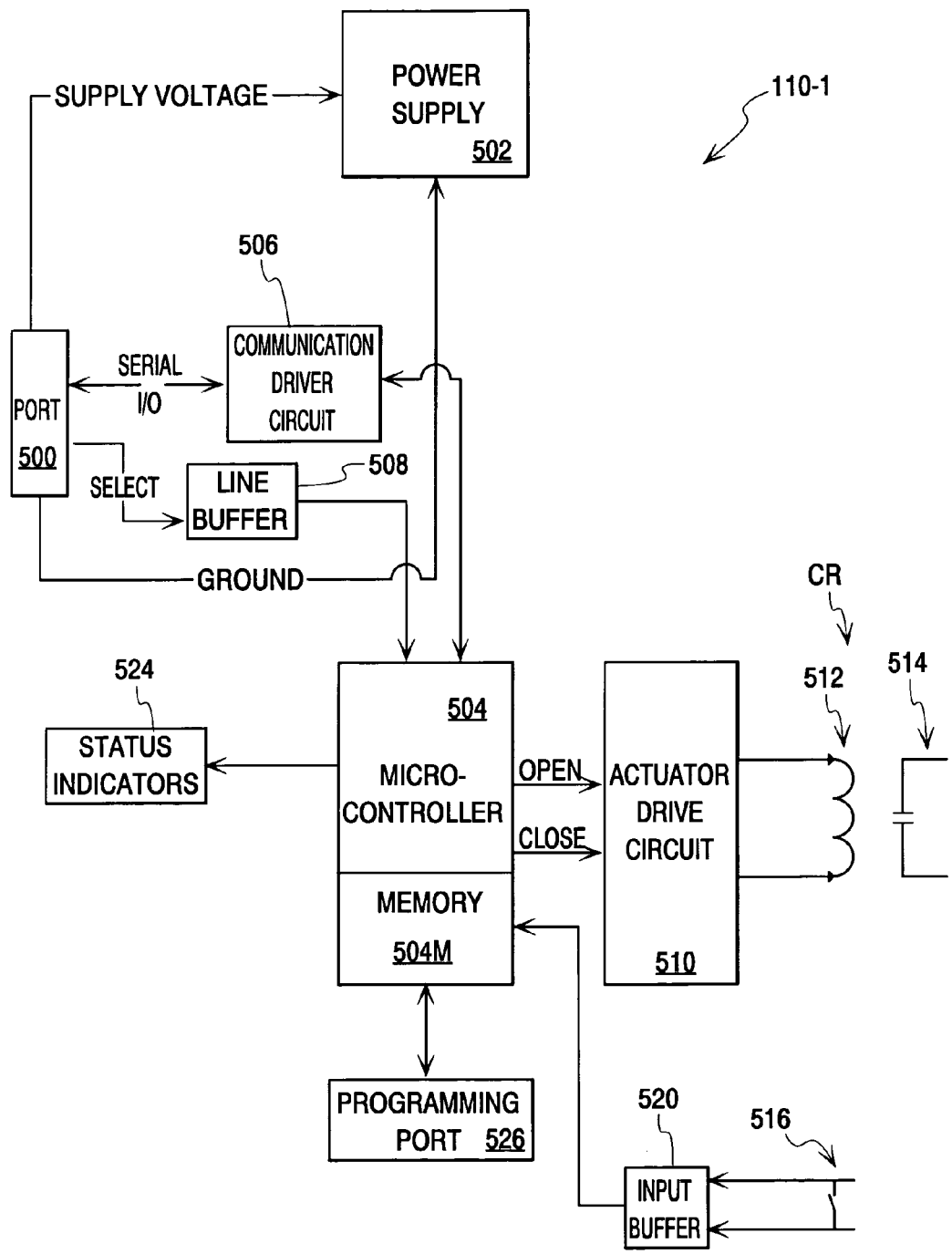
FIG. 6 is a detailed block diagram of the remote operated relay of FIG. 2.

FIG. 6 illustrates a detailed block diagram of the remote operated device in the form of a relay 110-1. Connection to the data rail 112 is through a four wire port 500. The port 500 includes a positive supply voltage and ground, a serial communication line, and a select line, as discussed above. The supply voltage and ground are fed to a power supply 502 to generate voltages needed for a microcontroller 504 and other circuits. A communication driver circuit 506 is used to isolate and drive a single wire serial communication line between the microcontroller 504 and the port 500 and thus the data rail 112. As discussed above, the single wire connection to each remote operated device 110 and to the I/O controller 124 is used to transmit and receive commands and data. This provides necessary isolation and protection. In the event of an individual device failure, the remainder of the devices continue to operate properly. The select line from the port 500 is buffered in a line buffer 508 and connected to the microcontroller 504. This select line is used to enable or disable communications to and from the remote operated device 110. By selecting more than one remote operated device, the I/O controller 124 can send commands or messages to multiple devices 110 at the same time, reducing traffic on the serial communication bus.

The microcontroller 504 comprises a conventional microcontroller and associated memory 504M, the memory storing software to run in the microcontroller 504.

The microcontroller 504 has OPEN and CLOSE lines to an actuator drive circuit 510. The control relay CR in the illustrated embodiment of the invention comprises an actuator coil 512 connected to the actuator drive circuit 510. The actuator drive circuit 510 provides current to drive the coil 512. An OPEN signal causes the drive circuit 510 to apply negative voltage to the actuator coil 512 for a short period of time (about 10 to 30 milliseconds). This causes an actuator plunger (not shown) to pull-in and become magnetically latched or held in the open position to open a contact 514. Power is then removed from the coil 512. A CLOSE signal from the microcontroller 504 causes the drive circuit 510 to apply a positive voltage to the actuator coil 512 for a shorter period of time (about 2 to 3 milliseconds). This period of time is sufficient for the actuator plunger (not shown) to become unlatched or released and springs force it to the closed position to close the contact 514. Again, power is then removed from the coil 512. Since the actuator is stable in both the open and closed positions, energy is only required to change position. This results in low energy solution. Also included in the actuator drive circuit 510 is protection from both open and closed signals applied at the same time, which could result in a short circuit of the power supply 502.

Feedback for actuator plunger position is provided by an auxiliary position switch 516. The signal is buffered in an input buffer 520 and then connected to the microcontroller 504. The microcontroller 504 uses the feedback information to respond to an I/O controller request for status or to retry a failed open or close attempt.

Additionally, the microcontroller 504 can send signals to various types of status indicators 524 such as LEDs to show open, closed, communications OK, operating properly, low voltage, etc. A programming port 526 can be used to program or update the microcontroller software or to load parameters such as on/off pulse rates or to troubleshoot the device 110.

As is apparent, the remote operated breaker 110-2, remoter operated meter, such as a current transformer, 110-3 and remote operated dimmer 110-4, see FIG. 2, include similar circuitry to the relay 110-1, except that the relay components are replaced by components required for the particular device application.

The software implemented in the remote operator device microcontroller 504 includes various routines. This includes a start up routine executed when the microcontroller 504 resets. It reads any data that has been stored in flash memory that needs to be modified during operations into ram variables. It turns out interrupts and otherwise initialize microcontroller operations and jumps into the status loop function.

The status loop function has several objectives. One is to keep the status data up to date to respond to status requests. Another is to run the state machine for the device, such as managing pulse widths and sequencing retry.

Pulse widths for open and close are not the same. Also, the pulse width for the open operation is not always the same, it increases by temperature/age/number of times close. An open contacts function will set up the sequencer for an open operation placing a start open pulse task and a stop open pulse task into a sequence or queue. The open command is always executed, regardless of the detected position of the contact, to overcome any failures in detecting the position of the contact. A close contacts function sets up a sequencer for a close operation replacing a start close pulse task and a stop close pulse task into the sequencer queue. The close command will always be executed, regardless of the detected position, to overcome any failures in detecting the position of the contact.

A communications handler function runs communications protocol over the serial line. The functions include decode command, open, close, send status and send report. A report operation function assembles the data required to respond to a report operation command received on the serial line.

Communications from the I/O controller 124 to the remote operated device 110 will be master-slave, with the I/O controller 124 being the master and the devices 110 the slaves. Once the I/O controller application sends an open or closed command, it will not wait for a response from the device 110. Rather, it hands over to the I/O sequencer queue, to perform a status check at a later time. This allows some time for the device 110 to settle down with its new status. Communications use an asynchronous serial communications protocol designed to operate on a point-to-point communication link capable of transmitting and receiving data.

Communications between the I/O controller 124 and the remote operated devices 110, also referred to as PODs, uses a protocol that defines eight message types coming from the I/O controller 124 (three of which return an answer):

Open the Contact;
Close the Contact;
Return Status (This is the one of the messages that returns an answer, and the answer is returned immediately, with no delay, regardless of the actual state of the POD.);
Perform Diagnostic "n";
Set Parameter "n"—the ability to change the basic timing parameters of the POD (pulse width, etc.);
Report on Operation (This is the one of the messages that returns an answer, and the answer is returned immediately, with no delay, regardless of the actual state of the POD.) A complete report on how the POD is operating, including all settable parameters, detailed timings observed, retry counts, time since last retry, recent trends, pulse widths that worked, how long before the status is stable, etc.;
Load New Program; and
Return Program version and CRC (This is the one of the messages that returns an answer, and the answer is returned immediately, with no delay, regardless of the actual state of the POD.) This will allows a user to see if a POD has been corrupted and/or has the correct version. This message can also serve to confirm that a new program has been successfully loaded.

The Status message return gives details about what happened in the remote operated device 110.

This protocol uses an enable line 188 coming from the I/O controller 124 to tell a particular remote operated device 110 that it is being addressed with a message. The message is then found on the serial line 186.

Once the I/O controller 124 sends "Open" or "Close" commands, it will not wait for a response from the remote operated device 110. Rather, it actually hands it over to the I/O sequencer queue, to do a status check at a later time. This allows some time for the remote operated device 110 to settle down with its new status. In the case of sending Open or Close commands to more than one remote operated device 110 at the same time, one Open command does the job after the I/O controller 124 enables the particular enable lines 188. For example, the I/O controller 124 might turn on the enable line for remote operated devices 110-4, 110-7, and 110-9, then send out one Open command. The remote operated devices 110-4, 110-7, and 110-9 would all see the Open command (and no others would see it) and would attempt to Open the MagLatch.

Figure 7:
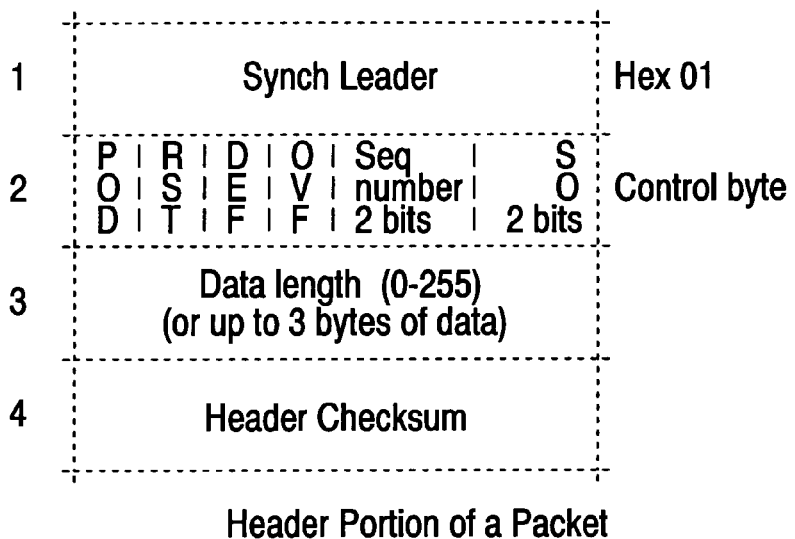
FIG. 7 is an illustration of a header portion of a packet used in communications between the I/O controller and the remote operated relay.

The communications protocol comprises an asynchronous transfer protocol. The format for a header portion of a packet is shown in FIG. 7, and is described as follows.

Synch Leader

RS-232 provides a self-clocking communications medium. The wires over which data flows are often placed in noisy environments where the noise can appear as added unwanted data. For this reason the beginning of a packet is denoted by a one octet SYNCH pattern. This allows the receiver to discard noise which appears on the connection prior to the reception of a packet. The SYNCH pattern is defined to be the one octet hex01, the ASCII Start Of Header character <SOH>.

The SYNCH pattern should ideally be unlikely to occur as the result of noise. Differing modems, etc. have differing responses to noise so this is hard to achieve. The pattern chosen is thought to be a good compromise since many modems manifest noise by setting the high order bits. Situations will occur in which receiver is scanning for the beginning of a packet and a spurious SYNCH pattern is seen. To detect situations of this type a header checksum is provided (see below).

Control Bits

The first octet following the SYNCH pattern contains three control flags, a 2-bit sequence number field, and a 2-bit Single Octets count.

POD—a remote operated device initiated message that is set when the Message originates in the remote operated device rather than the I/O controller.

RST—reset flag—sent from the remote operated device 110 to the I/O controller 124 in the first message the remote operated device 110 sends after a system reset.

DEF/FIN—Default/Finishing Flag, This flag has two meanings—one if the message originates in the remote operated device 110, and another if the message originates in the I/O controller 124. In a remote operated device message, it means (if on) that the default values of parameters have not yet been set—in particular, no "SetParameter" message has been received from the I/O controller 124 since the last reset of the remote operated device 110. In messages originating in the I/O controller 124, the FIN flag indicates that no more data will be sent to the remote operated device 110 from the I/O controller 124. It also indicates that no more data will be accepted. No data may be sent in a packet which has the FIN flag set. The FIN flag is intended for situations where there are multiple packets sent from the IO Board—not for single messages.

OVF—Command Overflow flag. This indicates that at least one command previously sent to the remote operated device 110 was ignored because there was no room in the task queue. This means that commands are being sent too quickly for the remote operated device 110 to handle them.

SN—Sequence Number. The Sequence Number associated with this packet. Note that this number is 0 through 3, then recycles to 0.

SO—Single Octets. If the SO value is non-zero it indicates that 1 to 3 octets of data are contained in this header, rather than in the data section. Since the amount of data is known by the SO value, the LENGTH field is superfluous and itself contains the first data octet. The SO value>0 removes the need to transmit the data portion of the packet in this special case. Without the SO>0, more than seven octets would be required of the packet; with it only four to seven are needed and so transmission efficiency is improved by 40 percent. The header checksum protects the single octets of data. If SO=0, then there is a LENGTH byte next, and there is a Data Section of this message.

Length

If SO=0, the second octet following the SYNCH pattern holds Length information. The length is limited to a maximum of 255.

Header Checksum

The header checksum algorithm is the 8-bit equivalent of the 16-bit data checksum detailed below. It is built and processed in a similar manner but is eight bits wide instead of sixteen. When sending the header checksum octet is initially cleared. An 8-bit sum of the control, length, and header checksum octets is formed employing end-around carry. That sum is then complemented and stored in the header checksum octet. Upon receipt the 8-bit end-around carry sum is formed of the same three octets. If the sum is octal 377 the header is presumed to be valid. In all other cases the header is assumed to be invalid.

Data Format

Figure 8:
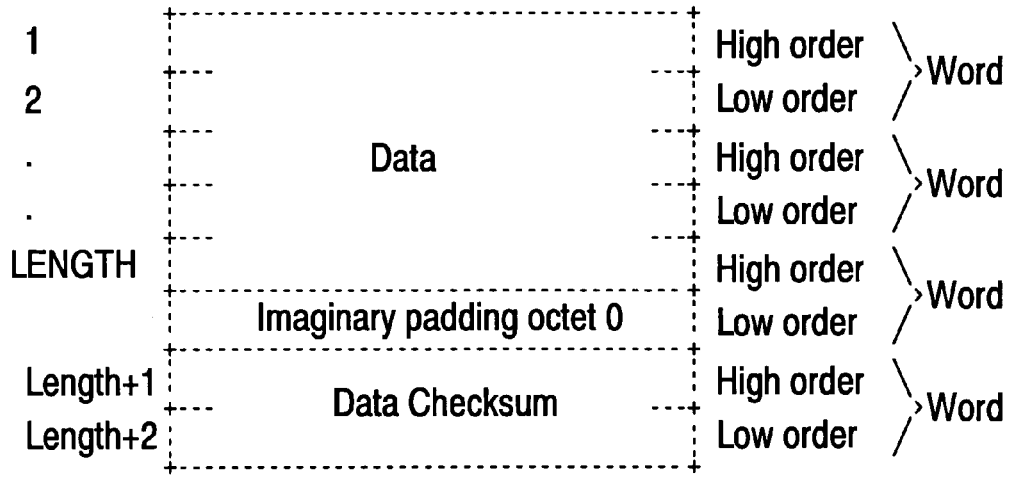
FIG. 8 is an illustration of a data portion of the packet of FIG. 7.

The data portion of a packet immediately follows the header if the SO flag is not set and LENGTH>0. It consists of LENGTH data octets immediately followed by two data checksum octets. If present the data portion contains LENGTH+2 octets. The data portion of a packet is illustrated in FIG. 8.

The last two octets of the data portion of a packet are a data checksum. A 16-bit checksum is used by this protocol to detect incorrectly transmitted data. This has shown itself to be a reliable method for detecting most categories of bit drop out and bit insertion. While it does not guarantee the detection of all such errors the probability of such an error going undetected is on the order of $2^{**}(-16)$.

The checksum octets follow the data to enable the sender of a packet to compute the checksum while transmitting a packet and the receiver to compute the checksum while receiving the packet. Thus neither must store the packet and then process the data for checksumming in a separate pass.

The order in which the 8-bit octets are assembled into 16-bit words, which is the low order octet and which is the high, must be rigidly specified for the purpose of computing 16-bit checksums. The protocol specifies the big endian ordering in the diagram of FIG. 8.

The checksum algorithm chosen is similar to that used by IP/TCP protocols. This algorithm has shown itself to be both reliable and relatively easy to compute. The checksum algorithm is:

Sender

The unsigned sum of the 16-bit words of the data portion of the packet is formed. Any overflow is added into the lowest order bit. This sum does not include the header portion of the packet. For the purpose of building a packet for transmission the two octet checksum field is zero. The sum formed is then bit complemented and inserted into the checksum field before transmission. If the total number of data octets is odd then the last octet is padded to the right (low order) with zeros to form a 16-bit word for checksum purposes. This pad octet is not transmitted as part of the packet.

Receiver

The sum is computed as above but including the values received in the checksum field. If the 16-bit sum is octal 177777 then the data is presumed to be valid. In all other cases the data is presumed to be invalid.

This unsigned 16-bit sum adds 16-bit quantities with any overflow bit added into the lowest order bit of the sum. This is called 'end around carry'. End around carry addition provides several properties: 1) It provides full commutivity of addition (summing in any order is equivalent), and 2) If you apply a given rotation to each quantity before addition and when the final total is formed apply the inverse rotation, then the result will be equivalent to any other rotation chosen. The latter property gives little endian machines like a PDP-11 the go ahead to pick up 16-bit quantities and add them in byte swapped order.

Thus in accordance with the invention a system is provided using asynchronous serial protocol communications between remote operated devices and an input/output controller in an electrical power distribution system. This system allows transfer of data in two directions. It supports the two-way exchange of data.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. An electrical distribution system for selectively connecting an electrical power source to load devices, comprising:
    a panelboard having load circuit positions;
    a remote operated device mountable in the panelboard comprising a load control device, a programmed controller for operating the load control device and a communication circuit; and an input/output (I/O) controller mounted in the panelboard for controlling operation of the remote operated device, the I/O controller comprising a programmed controller, and a communication circuit for communication with the remote operated device communication circuit, the communication circuits being adapted to communicate using an asynchronous communication protocol comprising transfer of data in two directions.

2. The electrical distribution system of claim 1 wherein the communication protocol provides message initiation in both the I/O controller and the remote operated device.

3. The electrical distribution system of claim 1 wherein the remote operated device sends a message to the I/O controller indicating that load control device operating parameters have not been set.

4. The electrical distribution system of claim 1 wherein the remote operated device sends a message to the I/O controller indicating that a task queue is full.

5. The electrical distribution system of claim 1 wherein the asynchronous communication protocol is adapted so that a message indicates amount of data sent in the message.

6. The electrical distribution system of claim 1 wherein the asynchronous communication protocol is adapted so that a message comprises a checksum value.

7. The electrical distribution system of claim 1 wherein the remote operated device comprises a relay and said asynchronous communication protocol is adapted so that the I/O controller sends messages to the remote operated device to open or close a contact.

8. The electrical distribution system of claim 1 wherein the asynchronous communication protocol is adapted so that the remote operated device sends messages comprising status of the load control device.

9. The electrical distribution system of claim 1 wherein the asynchronous communication protocol is adapted so that the remote operated device sends messages comprising parameters of operation of the load control device.

10. The electrical distribution system of claim 1 wherein the asynchronous communication protocol is adapted so that the I/O controller sends messages to the remote operated device to load a new control program.

11. A method of communicating in an electrical distribution system for selectively connecting an electrical power source to load devices, comprising:

providing a panelboard having load circuit positions;

providing a remote operated device mountable in the panelboard comprising a load control device and a programmed controller for operating the load control;

providing an input/output (I/O) controller mounted in the panelboard for controlling operation of the remote operated device, the I/O controller comprising a programmed controller; and establishing a communication link between the remote operated device and the I/O controller using an asynchronous communication protocol comprising transfer of data in two directions.

12. The method of claim 11 wherein the communication protocol provides message initiation in both the I/O controller and the remote operated device.

13. The method of claim 11 further comprising the remote operated device sending a message to the I/O controller indicating that load control device operating parameters have not been set.

14. The method of claim 11 further comprising the remote operated device sending a message to the I/O controller indicating that a task queue is full.

15. The method of claim 11 wherein the asynchronous communication protocol is adapted so that a message indicates amount of data sent in the message.

16. The method of claim 11 wherein the asynchronous communication protocol is adapted so that a message comprises a checksum value.

17. The method of claim 11 wherein the remote operated device comprises a relay and said asynchronous communication protocol is adapted so that the I/O controller sends messages to the remote operated device to open or close a contact.

18. The method of claim 11 wherein the asynchronous communication protocol is adapted so that the remote operated device sends messages comprising status of the load control device.

19. The method of claim 11 wherein the asynchronous communication protocol is adapted so that the remote operated device sends messages comprising parameters of operation of the load control device.

20. The method of claim 11 wherein the asynchronous communication protocol is adapted so that the I/O controller sends messages to the remote operated device to load a new control program.

* * * * *